United States Patent Office 3,575,837
Patented Apr. 20, 1971

3,575,837
MERCURY-PROCESS ELECTROLYTIC CELL
Hiroshi Shibata, Teruo Imai, Shigeji Kumaki, and Yoshimitsu Sukegawa, Iwaki-shi, Japan, assignors to Kureha Kagaku Kogyo Kabushiki Kaisha, Tokyo-to, Japan
Filed Apr. 8, 1968, Ser. No. 719,367
Claims priority, application Japan, Apr. 19, 1967, 42/24,560; Dec. 13, 1967 42/79,857
Int. Cl. C01d 1/08
U.S. Cl. 204—220    3 Claims

ABSTRACT OF THE DISCLOSURE

Most of the return brine in a mercury-cathode cell is caused to overflow, together with liberated chlorine, from the surface of the electrolyte out of the cell, while a part of the brine is discharged, together with the mercury, out of the cell through the mercury outlet therby to facilitate removal of contaminants and simplify apparatus organization.

BACKGROUND OF THE INVENTION

This invention relates generally to the field of electrolysis of sodium-chloride brine by the mercury process (known also as the amalgam process) and more particularly to improvements in mercury-process brine electrolytic cells (known also as mercury-cathode cells). More specifically, the invention concerns electrolytic cells of this type having outlets of new and improved construction.

The return common-salt solution or sodium-chloride brine of a mercury-process brine electrolytic cell is ordinarily separated from chlorine gas in a brine box with an upper part partitioned by a baffle plate and is then discharged through a discharge outlet. In known apparatus of this character, broken particles of electrode carbon and other solids are floating in the brine within the electrolytic cell, being buoyantly supported by the buoyant force of the bubbles of chlorine gas generated within the cell and by the surface tension of the brine. These floating particles are blocked by the baffle plate and accumulate on the upstream side thereof, subsequently losing buoyancy and sinking onto the surface of the mercury below the brine.

Consequently, the mercury contaminants increase and give rise to problems such as an increase in the frequency with which the contaminants must be removed by scooping.

Furthermore, even in brine in which the surface contaminants have sunk in this manner, there is a substantial quantity of particles of impurities still suspended in the intermediate levels of the brine. Accordingly, it is necessary to separate out these contaminants when salt is further dissolved in this brine and the brine is purified.

SUMMARY OF THE INVENTION

A first object of the present invention is to prevent the sinking and settling of floating particles of contaminants by deleting the baffle plate within the electrolytic cell and conducting out the return brine together with the chlorine gas.

In a conventional apparatus, however, the return brine is conducted out through a relatively narrow outlet passage such as a pipe, and when the brine collects at one point in this outlet passage, the floating contaminants mutually collide and thereby lose buoyancy, whereby a large quantity of these contaminants sinks. Furthermore, such a narrow brine outlet passage is not suitable since vortices readily form in the vicinity of the return brine outlet.

A second object of the invention is to overcome this difficulty by providing a mercury-process brine electrolytic cell in which, along the entire length of one transverse wall thereof, narrow gaps or slots or numerous perforations are provided through the wall and a return brine passageway is provided on the outer side of this transverse wall thereby to cause the brine to be discharged together with chlorine through these narrow openings into the return brine passageway.

According to the present invention, briefly summarised, there are provided a method and means whereby, in a mercury-process electrolytic cell, the return brine is caused to overflow together with liberated chlorine from the surface of the brine electrolyte into a passageway outside of the electrolytic cell.

According to the present invention, in another aspect thereof, there are provided a method and means whereby, in an electrolytic cell of the above stated character, the greater part of the return brine is caused to overflow together with liberated chlorine as described above, while a part of the brine is discharged together with the mercury out of the cell through a mercury outlet.

BRIEF DESCRIPTION OF THE DRAWINGS

The nature, principle, details, and utility of the invention will be more clearly apparent from the following detailed description with respect to preferred embodiments of the invention when read in conjunction with the accompanying drawings, in which like parts are designated by like reference numerals.

In the drawings.

DETAILED DESCRIPTION

Figure 1:
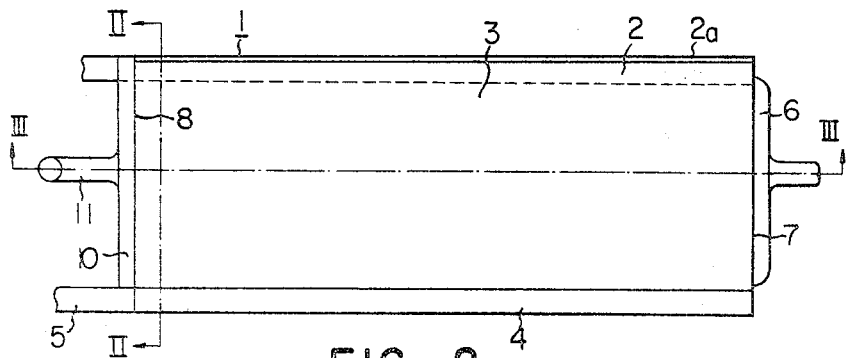
FIG. 1 is a plan view showing one example of an electrolytic cell embodying the invention.
Figure 2:
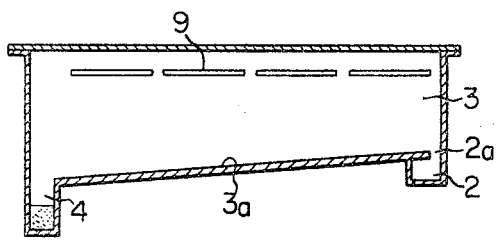
FIG. 2 is a sectional view taken along the plane indicated by line II—II in FIG. 1.
Figure 3:
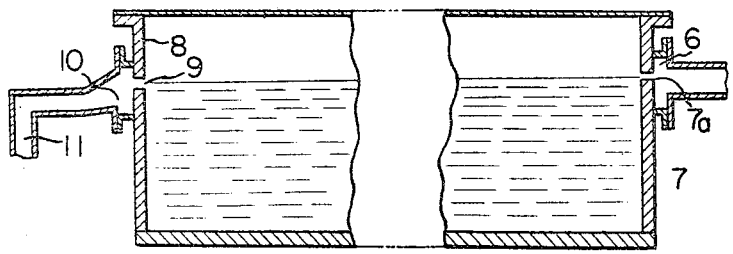
FIG. 3 is a sectional view taken along the plane indicated by line III—III in FIG. 1.

In one example of an electrolytic cell according to the invention as illustrated in FIGS. 1, 2, and 3, a mercury inlet passageway 2 as provided below the bottom plate 3a of the electrolytic cell 1 along one lateral side thereof and communicates with an electrolytic chamber 3 thereabove through a narrow slot 2a. A trough 4 is provided along the opposite lateral side of the cell 1 and below the level of the bottom plate 3a.

Accordingly, the mercury which has been delivered by a mercury pump (not shown) into the mercury inlet passageway 2 passes through the slot 2a into the electrolytic chamber 3 and, as it flows along the bottom plate 3a, functions as the cathode in the electrolysis of brine. At the same time, a part of the mercury itself is transformed into an amalgam and reaches the trough 4. Then, at the outlet end of this trough 4, the amalgam is separated out and is conducted out through a passage 5 outside of the cell to a denuding tower (not shown).

At the same time, brine is supplied by way of a passageway 6, through a narrow gay 7a in the upper part of a transverse wall 7 at one end of the cell 1, and into the electrolytic chamber 3, where electrolysis of the brine is carried out to generate chlorine. The resulting dilute brine, together with chlorine gas, passes through narrow slots or gaps 9 povided across the entire length of a transverse wall 8 on the end opposite that of transverse wall 7 and is discharged into a narrow passage 10 provided on the outer side of the wall 8 at the upper part thereof.

The return brine and chlorine gas thus discharged pass through a passage 11 and enter a main passage connected to other similar electrolytic cells (not shown), and the chlorine gas is separated from the brine in this main passage and removed therefrom. The return brine thus separated from the chlorine gas is separated from contaminants by a liquid cyclone separator (not shown) and is recirculated to a salt dissolving and brine treatment process (not shown).

Figure 4:
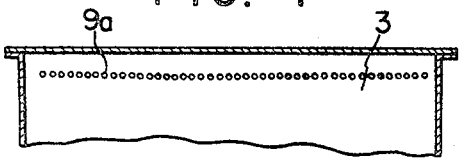
FIG. 4 is a fragmentary elevational view showing another example of outlet openings for brine and chlorine gas in accordance with the invention.

In place of the narrow gaps 9 in the above described electrolytic cell, it is also possible to use numerous perforations 9a as shown in FIG. 4 for supplying and discharging the brine.

In the electrolytic cell 1 of the above described example, the direction of flow of the mercury in the electrolytic chamber 3 and the direction of flow of the brine are perpendicular to each other. That is, the transverse walls 7 and 8 in which the brine inlet and outlet apertures are provided constitute the lateral side surfaces of the passage for the mercury flow. Alternatively, however, the flow directions of the mercury and the brine may be the same with the brine inlet and outlet at the inlet and outlet of the mercury flow path.

While the brine outlet in the electrolytic cell of the invention is in the form of narrow gaps or perforations in the upper part of a transverse wall, it is not necessary that all of the brine to be discharged from the electrolytic cell flow out of this brine outlet, and a portion of the discharge brine may be caused to flow out through one or more other outlets. For example, the cell may be so designed that most of the brine overflows out through the upper part of a transverse wall together with chlorine gas, while the remainder of the brine is discharged out of cell together with the outflowing mercury and contaminants floating above the mercury.

By such an organisation, moreover, the contaminants floating on the surface of the mercury do not remain stagnant within the electrolytic cell. Accordingly, this feature, in conjunction with the advantage feature of the invention whereby the contamnants floating on the surface of the brine are swept away smoothly through the upper part of a transverse wall, affords an even more thorough removal of contaminants within the electrolytic cell.

Figure 5:
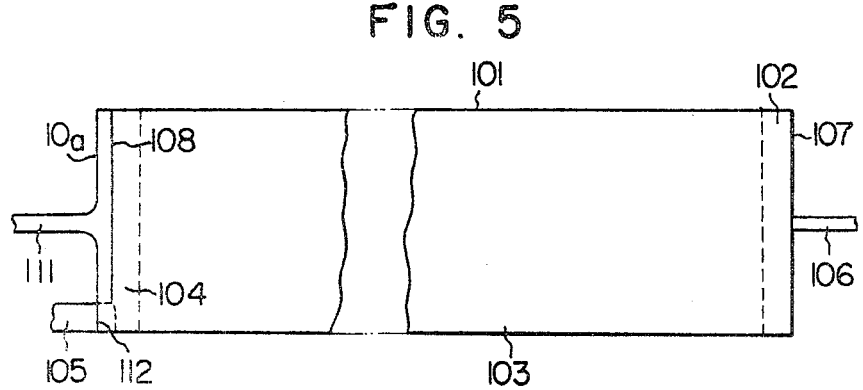
FIG. 5 is a plan view showing another example of an electrolytic cell embodying the invention.
Figure 6:
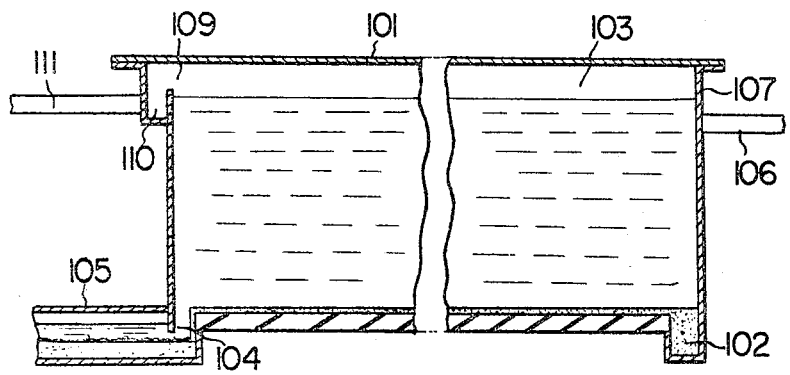
FIG. 6 is an elevational view, mostly in section, as viewed in the upward direction in FIG. 5.
Figure 7:
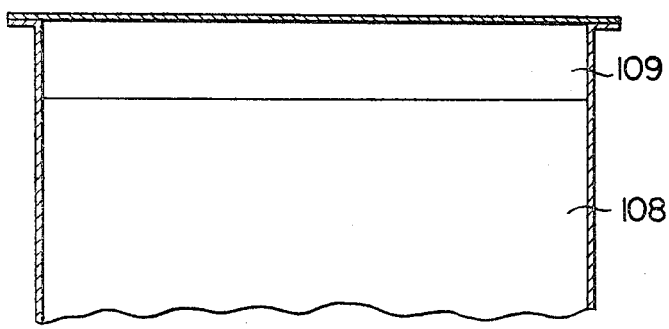
FIG. 7 is a partial elevational view showing the downstream transverse wall of the electrolytic cell shown in FIGS. 5 and 6.

One example of such an organisation according to the invention is illustrated in FIGS. 5, 6, 7. In this cell, the inlet mercury enters through a trough-like passageway 102 at the bottom of a transverse wall 107 at one end in the longitudinal direction of an electrolytic cell 101 and, flowing along the bottom of an electrolytic chamber 103 and passing through a trough-like passageway 104, is discharged, together with a small quantity of brine and contaminants, through the end 112 of the passageway into an outlet passage 105.

At the same time, the greater part of the brine enters the electrolytic chamber 103 through an inlet passage 106 and an inlet provided at the upper part of the transverse wall 107 and flows across the chamber 103. This brine is then discharged, together with chlorine gas generated in the electrolytic chamber 103, through a narrow gap 109 provided across the entire length of a transverse wall 108 at the downstream end of the cell 101 and into a passageway 110 outside of the vessel and is conducted by a passage 111 to a main passage (not shown).

The mercury which has flowed out through the outlet passage 105 together with a small quantity of brine and contaminants is separated from the contaminants and brine at one part of the flow path and is conducted to a denuding tower (not shown). The brine thus separated is then passed, together with the brine which has flowed out through the upper part of the cell transverse wall 108, through a liquid cyclone separator and conducted to a salt dissolving the brine purification process (not shown). Furthermore, the contaminants present between the mercury and the brine are removed from time to time by scooping from the flow path.

The narrow gaps or perforations provided across the entire transverse wall of the electrolytic cell of the invention are not necessarily of uniform dimensions or shape across the entire length of the wall. For example, in the case where the mercury flow and the brine flow are perpendicular to each other as in the example illustrated in FIG. 1, it is possible, in order to cause the brine to flow uniformly, to vary suitably, from the upstream end to the downstream end of the mercury flow, the height or width of the narrow gaps or the size or spacing of the perforations and other geometric relationships, consideration being given to the quantity of brine in stagnant state due to the depth of the brine in the cell, the resistance of the electrodes, and other like factors.

An advantageous feature of the invention is that, since the brine outlet extends across the full width of the electrolytic cell the flow of the brine within the electrolytic chamber becomes uniform, whereby disturbance of the mercury surface due to the brine flow is prevented. Another feature of the invention is that, since the return brine and generated chlorine are removed through the same outlet, the contaminants such as carbon particles suspended in the brine within the cell overflow, together with the chlorine gas, through the narrow gaps or perforations provided across the entire length of the transverse wall at the outlet end. Accordingly, accumulation of contaminants at a single point in the vicinity of the outlet and sinking thereof are prevented.

Furthermore, by collecting the return brine from numerous electrolytic cells into a single path, it is also possible to accomplish removal of contaminants in the brine simultaneously with brine purification either before or after salt dissolving, and since this has been an ordinary practice even heretofore, the operation has been greatly simplified. A further feature of the invention is that, while the chlorine and brine has heretofore been removed at a separate discharge pipe respectively for each electrolytic cell, the present invention provides an arrangement wherein the chlorine and brine from each cell are discharged together into a respective passageway outside of the cell, and then chlorine and brine thus discharged from all cells are confluently gathered in a common main flow path, where the separation of the chlorine and brine can be carried out. Accordingly, the construction of each electrolytic cell becomes simple, and, moreover, a substantial saving in the piping is afforded.

By the practice of the invention as described above, the greater portion of the brine is caused to overflow through the upper part of the transverse wall at the outlet end of the electrolytic cell, and, at the same time, a small portion of the brine is discharged together with the mercury. Accordingly, there are no obstructions whatsoever with respect to the flow of contaminants at the brine outlet, and there is no possibility of back flow of contaminants into the electrolytic chamber, whereby the concentration of contaminants within the vessel is maintained at a minimum. As a result, the formation of mercury butter is reduced, and, moreover, the current efficiency is increased.

It should be understood of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:

1. A mercury cathode sodium chloride brine electrolytic cell having a transverse wall provided across each end thereof, the transverse wall at one end of said cell having a brine inlet in the upper portion thereof, said cell having mercury inlet means and mercury outlet means spaced from each other along the bottom of said cell for flowing a laminar flow of mercury along the bottom of said cell, the transverse wall at the other end of said cell having a narrow overflow outlet for brine and chlorine extending across the entire width of said transverse wall, and a trough for receiving brine and chlorine mounted on the outer side of said transverse wall just below said outlet for brine and chlorine.

2. The mercury cathode sodium chloride brine electrolytic cell as claimed in claim 1 in which the narrow outlet for brine and chlorine is a single continuous outlet.

3. The mercury cathode sodium chloride brine electrolytic cell as claimed in claim 1 in which the narrow outlet for brine and chlorine is a discontinuous outlet consisting of a plurality of divisional outlets.

References Cited
UNITED STATES PATENTS

| | | | |
|---|---|---|---|
| 619,349 | 2/1899 | Riecken | 204—220 |
| 645,055 | 3/1900 | Anderson | 204—220 |
| 771,833 | 10/1904 | Roepper et al. | 204—220 |
| 1,374,370 | 4/1921 | Ewell | 204—220 |
| 2,104,678 | 1/1938 | Sorensen | 204—220 |
| 2,323,042 | 6/1943 | Honsberg | 204—220 |

TA-HSUNG TUNG, Primary Examiner

U.S. Cl. X.R.

204—99, 250